United States Patent
Grüninger

(10) Patent No.: US 11,284,598 B2
(45) Date of Patent: Mar. 29, 2022

(54) APPARATUS FOR CHEESE PRODUCTION

(71) Applicant: KALT MASCHINENBAU AG, Lütisburg (CH)

(72) Inventor: Siegfried Grüninger, St. Gallen (CH)

(73) Assignee: Kalt Maschinenbau AG, Lütisburg (CH)

( * ) Notice: Subject to any disclaimer, the term of this patent is extended or adjusted under 35 U.S.C. 154(b) by 238 days.

(21) Appl. No.: 16/538,891

(22) Filed: Aug. 13, 2019

(65) Prior Publication Data
US 2020/0053975 A1    Feb. 20, 2020

(30) Foreign Application Priority Data
Aug. 20, 2018 (CH) ..................... 01007/18

(51) Int. Cl.
*A23C 19/00* (2006.01)
*A01J 25/15* (2006.01)
*A01J 25/13* (2006.01)
*A23C 19/14* (2006.01)

(52) U.S. Cl.
CPC ............. *A01J 25/15* (2013.01); *A01J 25/13* (2013.01); *A23C 19/14* (2013.01)

(58) Field of Classification Search
CPC ........ A01J 25/00; A01J 25/001; A01J 25/002; A01J 25/12; A01J 25/13; A01J 25/15; A23C 19/00; A23C 19/14
See application file for complete search history.

(56) References Cited

U.S. PATENT DOCUMENTS

| 913,889 | A |  | 3/1909 | Hershiser |
| 2,815,708 | A |  | 12/1957 | Pauly |
| 2,846,767 | A |  | 8/1958 | Hensgen |
| 2,917,827 | A | * | 12/1959 | Lankford ............. A01J 25/002 99/348 |
| 2,942,983 | A |  | 6/1960 | Sadler |

(Continued)

FOREIGN PATENT DOCUMENTS

| AU | 2005239793 B2 | 2/2008 |
| BR | 9300409 A | 9/1993 |

(Continued)

OTHER PUBLICATIONS

For U.S. Appl. No. 15/344,909: Notice of Allowance dated Jun. 16, 2020.

(Continued)

*Primary Examiner* — Joseph S Del Sole
*Assistant Examiner* — Thu-Khanh T Nguyen
(74) *Attorney, Agent, or Firm* — Fielt Intellectual Property Law; Paul D. Bianco; Gary S. Winer

(57) ABSTRACT

An apparatus for cheese production, in particular a cassette press and an articulated tube arrangement for feeding cheese raw mixture from a cheese maker into molds of the cassette press, wherein the most uniform, constant filling can be achieved. The device has a trough open in plan view, a pressing head having a plurality of press plungers aligned on the cheese molds for pressing the cheese raw mixture and a distributor head for filling in the cheese raw mixture. The distributor head is movable along the longitudinal sides of the trough. The distributor head is rotatably coupled to an articulated tube arrangement for feeding the cheese raw mixture of a cheese maker.

11 Claims, 1 Drawing Sheet

(56) References Cited

U.S. PATENT DOCUMENTS

| | | |
|---|---|---|
| 3,098,297 A | 7/1963 | Boer |
| 3,192,626 A | 7/1965 | Boeuf |
| 3,353,269 A | 11/1967 | Lambert |
| 3,514,857 A | 6/1970 | Rossen |
| 3,541,687 A | 11/1970 | Peters |
| 3,615,587 A | 10/1971 | Koopmans |
| 3,650,030 A | 3/1972 | Delamere |
| 3,733,804 A | 5/1973 | Diersbock |
| 3,748,072 A | 7/1973 | Whelan |
| 3,783,166 A | 1/1974 | Peters |
| 3,797,980 A | 3/1974 | Budahn |
| 3,802,332 A | 4/1974 | Fassbender et al. |
| 3,836,688 A | 9/1974 | Fischer |
| 3,838,955 A | 10/1974 | Dubbeld |
| 3,841,210 A | 10/1974 | Brog |
| 3,973,042 A | 8/1976 | Kosikowski et al. |
| 4,049,838 A | 9/1977 | Krueger et al. |
| 4,068,014 A | 1/1978 | Heimbruch |
| 4,268,528 A | 5/1981 | Montigny |
| 4,318,684 A | 3/1982 | Boucher |
| 4,418,616 A | 12/1983 | Streeter et al. |
| 4,440,073 A | 4/1984 | Quilliou |
| 4,472,339 A | 9/1984 | van der Ploeg et al. |
| 4,509,413 A | 4/1985 | Granberg et al. |
| 4,515,815 A | 5/1985 | Kosikowski |
| 4,750,415 A | 6/1988 | Ostemar |
| 4,817,515 A | 4/1989 | Bjerre et al. |
| 5,052,290 A | 10/1991 | Nielsen |
| 5,082,681 A | 1/1992 | Barlow et al. |
| 5,206,496 A | 4/1993 | Clement et al. |
| 5,794,779 A | 8/1998 | Weinheimer et al. |
| 5,974,779 A | 11/1999 | Orscheln et al. |
| 6,026,737 A | 2/2000 | D'Alterio et al. |
| 6,465,033 B2 | 10/2002 | Menninga et al. |
| 6,912,949 B2 | 7/2005 | Brizio |
| 7,757,876 B1 | 7/2010 | Ditter |
| 8,322,535 B2 | 12/2012 | Shoham et al. |
| 8,512,792 B2 | 8/2013 | Spijkerman |
| 8,916,221 B2 | 12/2014 | Waldburger |
| 9,049,837 B2 | 6/2015 | Waldburger |
| 9,713,314 B2 | 7/2017 | Waldburger |
| 9,968,070 B2 | 5/2018 | Waldburger |
| 10,729,095 B2 | 8/2020 | Kong |
| 10,785,953 B2 | 9/2020 | Gruninger |
| 10,785,954 B2 | 9/2020 | Gruninger |
| 2007/0196537 A1 | 8/2007 | Winkler |
| 2008/0036112 A1 | 2/2008 | Gilg |
| 2010/0239730 A1 | 9/2010 | Ditter |
| 2010/0263551 A1 | 10/2010 | Pavero |
| 2014/0087014 A1 | 3/2014 | Waldburger |
| 2014/0087045 A1 | 3/2014 | Waldburger |
| 2015/0320007 A1 | 11/2015 | Hamm et al. |
| 2017/0135309 A1 | 5/2017 | Gruninger |
| 2017/0135310 A1 | 5/2017 | Gruninger |
| 2017/0303498 A1 | 10/2017 | Kong |
| 2019/0191659 A1 | 6/2019 | Waldburger |
| 2020/0390121 A1 | 12/2020 | Gruninger |

FOREIGN PATENT DOCUMENTS

| | | |
|---|---|---|
| CH | 353573 A5 | 5/1961 |
| CH | 563142 | 2/1972 |
| CH | 573142 B5 | 9/1972 |
| CH | 704208 A2 | 6/2012 |
| CH | 706999 A1 | 3/2014 |
| CH | 707000 A1 | 3/2014 |
| DE | 821572 C | 7/1949 |
| DE | 878577 C | 6/1953 |
| DE | 922448 C | 1/1955 |
| DE | 1030612 B | 5/1958 |
| DE | 1582967 A1 | 7/1970 |
| DE | 2823182 A1 | 12/1978 |
| DE | 2950497 A1 | 6/1981 |
| DE | 3529895 A1 | 2/1987 |
| DE | 19613068 A1 | 10/1997 |
| DE | 29812845 U1 | 12/1998 |
| EP | 0126861 A1 | 3/1984 |
| EP | 350777 A1 | 1/1990 |
| EP | 0350777 A1 | 1/1990 |
| EP | 406899 A1 | 1/1991 |
| EP | 0406899 A1 | 1/1991 |
| EP | 0 406 899 B1 | 4/1992 |
| EP | 0543185 A1 | 5/1993 |
| EP | 0543899 A1 | 6/1993 |
| EP | 0922448 A2 | 6/1999 |
| EP | 1269832 A1 | 1/2003 |
| EP | 1591016 A1 | 11/2005 |
| EP | 1769676 A1 | 4/2007 |
| EP | 2710888 A1 | 3/2014 |
| EP | 2710889 A1 | 3/2014 |
| EP | 3167709 A1 | 5/2017 |
| FR | 2146532 A5 | 3/1973 |
| FR | 2462253 A5 | 2/1981 |
| FR | 2473840 A1 | 7/1981 |
| FR | 2527421 A1 | 12/1983 |
| FR | 2919467 A1 | 2/2009 |
| FR | 2981827 A1 | 5/2013 |
| GB | 951746 A | 3/1964 |
| GB | 1054727 A2 | 1/1967 |
| GB | 2065487 A | 7/1981 |
| GB | 2256379 A1 | 12/1992 |
| NL | 8402355 A | 2/1986 |
| WO | 1992/03297 A1 | 3/1992 |
| WO | 2004/087513 A1 | 10/2004 |
| WO | 2013/051950 A1 | 4/2013 |

OTHER PUBLICATIONS

For U.S. Appl. No. 15/344,770: (009) Office Actions dated Jan. 24, 2018; Jul. 24, 2018; Feb. 21, 2019; Sep. 25, 2019 Responses dated Mar. 26, 2018; Oct. 24, 2018; May 21, 2019.

For U.S. Appl. No. 15/344,909: (010) Office Actions dated Jan. 24, 2018; Jul. 24, 2018; Feb. 21, 2019; Sep. 25, 2019 Responses dated Mar. 26, 2018; Oct. 24, 2018; May 21, 2019.

For U.S. Appl. No. 15/486,464: (011) Office Action dated Sep. 25, 2019.

For U.S. Appl. No. 16/538,891: Response dated Oct. 22, 2019.

For U.S. Appl. No. 15/344,770: Response dated Dec. 26, 2019 notice of allowance dated Apr. 28, 2020.

For U.S. Appl. No. 15/344,909: response dated Dec. 26, 2019.

For U.S. Appl. No. 15/486,464: Response filed Dec. 26, 2019 notice of allowance dated Mar. 31, 2020.

Derwent abstract for SU876084, published Oct. 1981 , 2 pages 002.

European Search Report issued for Application No. 13183880.7, dated Feb. 4, 2014, 6 pages 002.

University of Montana, Agricultural Experiment Station Circular #1, 1910 002.

European Search Report issued for Application No. 14181770, dated Feb. 9, 2015 (wth machine translation) 004.

Google search results for "Considur fine hole trangular", retrieved Oct. 24, 20106 showing article entitled Belts With Interlaced Bards, Welded Wedge Wire Screens From Hein, www.hellotrade.com, 1 page, shown publication date Apr. 29, 2013 004.

Webpage from Hein Lehrmann website, Considur fine hole sheets, 1 page, retrieved Oct. 24, 2016, publication date prior to Jan. 1, 2013 004.

European Search Report issued for Application No. 15158045, dated Jul. 14, 2015, 3 pages 005.

European Search Report issued for Application No. 16194574, dated Feb. 14, 2017, 4 pages 009.

European Search Report issued for Application No. 16195210.6, dated Mar. 27, 2017, 3 pages 010.

European Search Report issued for Application No. 17165041, dated Sep. 7, 2017, 2 pages 011.

European Search Report for European Application EP 20179193 dated Nov. 3, 2020.

For U.S. Appl. No. 16/903,425; Office action dated Jun. 23, 2021.

For U.S. Appl. No. 16/903,425;Office action dated May 3, 2021.

(56) References Cited

OTHER PUBLICATIONS

For U.S. Appl. No. 16/903,425; Response filed Jun. 8, 2021.

* cited by examiner

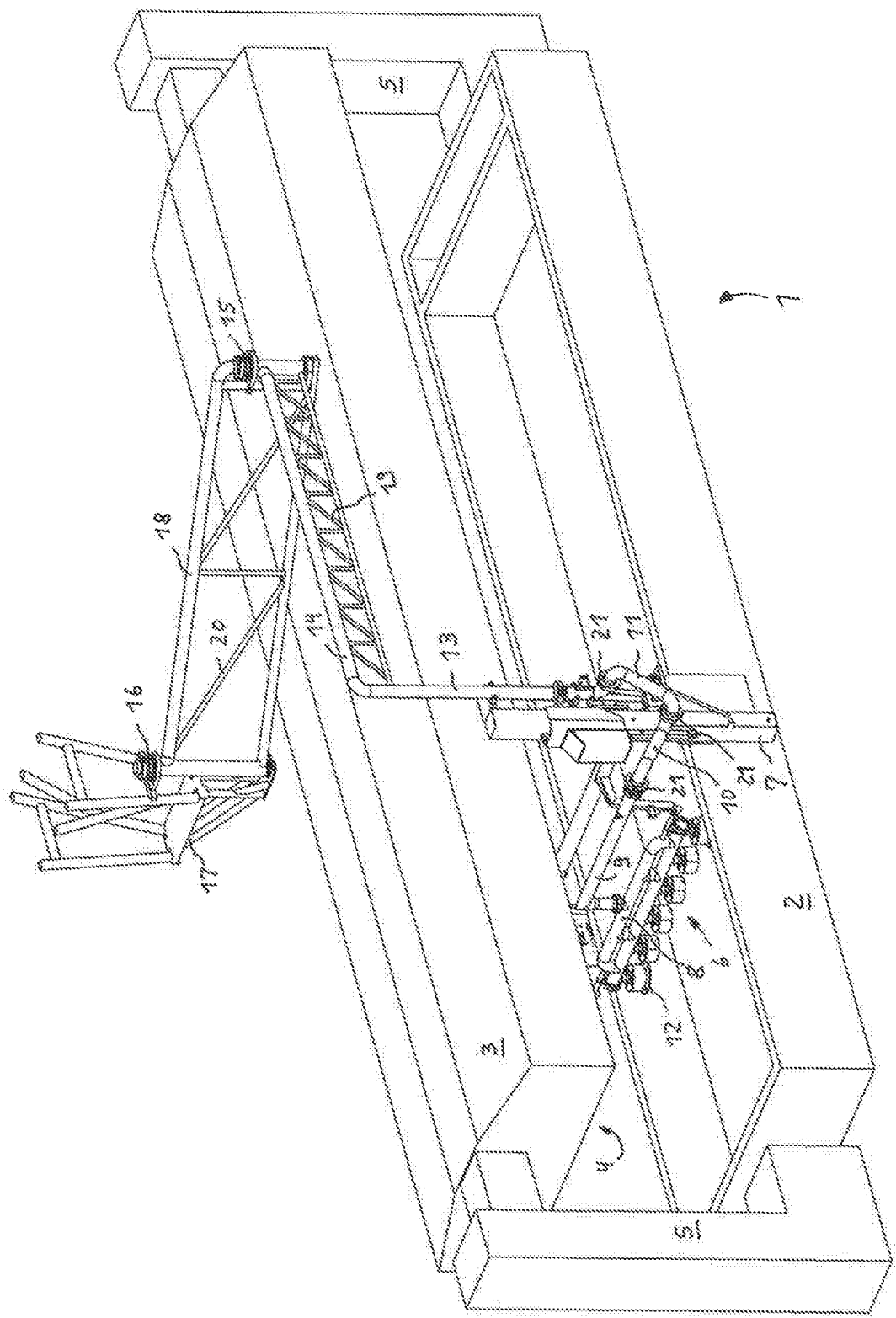

APPARATUS FOR CHEESE PRODUCTION

FIELD OF THE INVENTION

The invention relates to an apparatus for cheese production, in particular a cassette press and an articulated tube arrangement for feeding cheese raw mixture from a cheese maker into molds of the cassette press.

BACKGROUND

An apparatus for the industrial production of cheeses is known, for example, from EP-A-350777. This comprises a filling-in press having a trough that is rectangular and open above for accommodating molds, a column frame for arranging a raisable and lowerable pressing head and a distributor head for feeding and dosing the cheese raw mixture into the molds and a portal carriage that is movable on the trough for guiding the distributor head and for handling a turning mechanism for the molds. The distributor head must be changed manually. EP-A-406899 shows a development of such an apparatus, in which the molds are accommodated in cassettes, which in turn are arranged compactly and in a row in the trough. Above the molds, a pressing head is provided having press plungers aligned with the molds for pressing the cheese raw mixture. The cassettes have a gap-minimizing edge formation and a mechanized device is provided for pushing the cassettes.

The cheese raw mixture passes through a feed tube, the ends of which are connected to the boiler of a cheese maker or to the distributor head, into the distributor head and thence into the round or angular molds, which are arranged in the trough of the cassette press. The tube must be formed so that it can accompany the movement of the portal carriage when filling the molds. However, the accuracy of filling the individual molds can vary to an undesirable degree.

SUMMARY

One aspect of the invention relates to minimizing the disadvantages of the prior art and increasing the accuracy of filling the molds with cheese raw mixture and to achieve the most uniform, constant filling.

According to the invention, an apparatus for cheese production, in particular a cassette press, having round or angular cheese molds, for liquid-reducing pressing of cheese raw mixture, has a trough open in top view, a pressing head having a plurality of press plungers aligned on the cheese molds for pressing the cheese raw mixture and a distributor head for filling in the cheese raw mixture. The distributor head is arranged movable along the longitudinal sides of the trough.

Furthermore, an articulated tube arrangement for feeding the cheese raw mixture of a cheese maker is rotatably coupled to the distributor head.

Preferred embodiments are also disclosed.

Advantageously, the articulated tube arrangement comprises a double joint of two tubular joint pieces that are angularly arranged to each other and pivotally connected to each other, wherein the double joint respectively of one of the joint pieces is coupled with the distributor head by means of an articulated joint.

A tube which is approximately perpendicular to the plane of the trough, rotatably connects to the double joint, which tube also serves as a reservoir for cheese raw mixture.

Preferably, a horizontally mounted tube connects to the vertically standing tube, which horizontally mounted tube in turn is rotatably connected to a further, horizontally mounted tube, wherein the tubes are attached to a hitch.

The invention further relates to an articulated tube arrangement for feeding cheese raw mixture from a cheese maker to a device for liquid-reducing pressing of the cheese raw mixture, in particular a cassette press.

The articulated tube arrangement according to the invention enables an accurate distribution of the cheese raw mixture, in particular an equal distribution of curd on the individual molds, so that the weight of the soft cheese after pressing the whey is about the same. It has been shown in tests that, in previously known solutions, continuously changing vertical angles of inclination of articulated tubes have a high influence on the distribution accuracy of the curd.

BRIEF DESCRIPTION OF THE DRAWING

The invention is described below in an embodiment with reference to a drawing. In the drawing, the single FIGURE shows a cassette press having an articulated tube arrangement according the invention.

DETAILED DESCRIPTION

A cassette press 1 comprises in the example presented at least a trough 2, that is rectangular in top view and open above, of the cassette press 1 with cassettes (not shown) that are rectangular in top view and open above, which are arranged in rows next to each other transverse to the longitudinal direction of the trough, wherein the cassettes have a gap-minimizing edge formation at contact in the upper region of their longitudinal sides and possibly are substantially covered in longitudinal gaps extending in the longitudinal direction of the trough 2 between cassettes and longitudinal sides of the trough 2, molds (not shown) arrangeable in the cassettes for accommodating the pressed cheese raw mixture, wherein a part of the cassette can be and in the example, each consists of an inner, perforated casing and an outer shell having at least one outlet for the liquid to be pressed out, and wherein a cassette comprises at least one mold, preferably six to eighteen molds;

edge sheets (height of a few centimeters) are arranged on the upper edges, which form the outer sides of the cassette block in the trough 2 in the longitudinal and transverse direction, preferably welded, to enable filling in of the cheese raw mixture to above the upper edge of the cassette a pressing head 4, arranged on the end columns 5, having a plurality of press plungers aligned on the molds for pressing the cheese raw mixture, for example, formed according to the disclosure of EP-B-543899, and optionally downholder for pressing the pressing head 4 of the cassettes;

a filling apparatus for filling in the cheese raw mixture, which is arranged on a portal carriage 7, which is movable motor-driven along the longitudinal sides of the trough 2;

a handling device for lifting, adding and removing a cassette on a conveyor (not shown) outside the trough 2;

a device for rotating/turning (not shown) the cassettes or a row of cassettes about their longitudinal axis;

a vertically movable blow-off device (not shown) having exhaust nozzles, wherein each mold of a cassette is associated with at least one exhaust nozzle, so as to empty the cheese loaves on the conveyor.

The filling apparatus comprises a distributor head 6 having a number of dosing heads 12, which is adapted to the number of molds arranged in a row in the trough 2. The distributor head 6 further comprises a distributor tube 8 and a feed tube 9 for feeding and distributing the cheese raw mixture onto the dosing heads 12.

The feed tube 9 is connected to a double joint of tubular joint pieces 10, 11 that are angularly arranged to each other and pivotally connected to each other by means of an articulated joint 21. The joint piece 10 is S-shaped and the joint piece 11 is angled U-shaped, wherein the short connecting legs are not substantially longer than the diameter of the joint pieces 10, 11. The straight portion of the joint pieces 10, 11 has a length which is a multiple of the diameter.

By means of a further articulated joint 21, an articulated connection is made to a tube 13 which is approximately perpendicular to the plane of the trough 2, which tube is attached to a hitch 17.

The approximately vertically arranged tube 13 also serves as a reservoir for cheese raw mixture and the compression of the curd in the whey of cheese raw mixture.

The hitch 17 is fastened to a hall ceiling or a high-level portal and comprises two horizontally arranged trusses 19, 20 pivotably connected to each other in via a connecting joint 15. Part of both trusses 19, 20 is in each case a tube 14, 18, wherein the tube 14 is connected to the tube 13 approximately at right angles (FIG. 1).

The truss 20, including the tube 20, is pivotally connected by means of a rotary joint 16 with the part of the hitch 17 fastened to the hall ceiling or hall wall. The tube 18 has a connection to the cheese maker, not shown.

During filling of the molds, the portal carriage 7 is moved with the distributor head 6 along the longitudinal axis of the trough 2 between the end columns 5. The articulated tube arrangement recreates this movement without dead centers or misalignments.

The tube 13 is always vertical and is constantly filled as a result of the double joint 10, 11 and the articulated connection of the hitch 17. The distribution of cheese raw mixture and in particular the curd on the molds is carried out evenly. There are no angular deviations that inhibit product flow of the articulated tube arrangement.

The arrangement of cassette press 1 and hitch 17 is only to ensure that the rotary joint 16, respectively the hitch 17 and connecting joint 15 respectively the tube 13 are located in the example above of the opposite longitudinal sides of the cassette press 1, to enable sufficient movement of the articulated tube arrangement.

The articulated tube arrangement according to the invention is, in comparison to previously known solutions, which also require a large room height due to the pivoting movement of a counterweight, arranged completely over the cassette press 1 and thus does not pose a threat to the operator.

REFERENCE NUMERALS 1 cassette press
2 trough
3 pressing head
4 press plunger
5 end column
6 distributor head
7 portal carriage
8 distributor tube
9 feed tube
10 joint piece
11 joint piece
12 dosing head
13 tube
14 tube
15 connecting joint
16 rotary joint
17 hitch
18 tube
19 truss
20 truss
21 articulated joint

What is claimed is:

1. An apparatus for cheese production using cheese molds for the liquid-reducing pressing of cheese raw mixture, the apparatus comprising:
   a trough open in plan view to form an open top surrounded by sides for containing the cheese molds and cheese raw mixture;
   a pressing head having a plurality of press plungers aligned with respect to the cheese molds for pressing the cheese raw mixture;
   an articulated tube arrangement including a double joint of two tubular joint pieces that are pivotally connected to each to be movable while remaining in mutual fluid communication for supplying the cheese raw mixture of a cheese maker; and
   a distributor head for filling the cheese molds with the cheese raw mixture, the distributor head being movable along a side of the trough, wherein the distributor head is rotatably coupled to the double joint by means of an articulated joint to thereby be movable while receiving the cheese raw mixture.

2. The apparatus of claim 1, wherein a down tube is aligned substantially perpendicularly to a plane defining the opening of the trough, the down tube being pivotably connected to the double joint upstream of the double joint.

3. The apparatus of claim 2, wherein a horizontally mounted first cross tube is connected to the down tube upstream of the down tube, the first cross tube in turn being pivotally connected to a second horizontally mounted second cross tube upstream of the first cross tube.

4. The apparatus of claim 3, wherein the down tube, first cross tube, and second cross tube are attached to an attachment device mounted at a height above the trough.

5. The apparatus of claim 4, wherein the attachment device is affixed at a location adjacent to a side of the trough opposite to the down tube, and the second cross tube extends over and across the trough.

6. An articulated tube arrangement for feeding cheese raw mixture from a cheese maker to a device for the liquid-reducing pressing of the cheese raw mixture, comprising:
   an articulated tube arrangement connectable to a source of the cheese raw mixture to be in fluid communication with the cheese raw mixture, the articulated tube arrangement including a double joint of two tubular joint pieces that are angularly arranged to each other and pivotally connected to each other to be movable while feeding the cheese raw mixture, which double joint is coupled by an articulated joint to a distributor head positionable above the cheese molds, the distributor head movable to successive cheese molds by movement of the articulated joint while distributing the cheese raw mixture.

7. The articulated tube arrangement of claim 6, wherein a substantially vertical tube pivotably connects to the double joint, the substantially vertical tube connected to a horizontally mounted tube which is in turn is pivotally connected to a second horizontally mounted tube.

8. An apparatus for cheese production, in particular a cassette press, having round or angular cheese molds, for the liquid-reducing pressing of cheese raw mixture, having a trough open in plan view, a pressing head having a plurality of press plungers aligned on the cheese molds for pressing the cheese raw mixture and a distributor head for filling in the cheese raw mixture, the distributor head being movable along the longitudinal sides of the trough, characterized in that the distributor head is rotatably coupled to an articulated tube arrangement for feeding the cheese raw mixture of a cheese maker, wherein the articulated tube arrangement comprises a double joint of two tubular joint pieces that are angularly arranged to each other and pivotally connected to each other, which double joint is coupled by means of an articulated joint to the distributor head.

9. The apparatus of claim 8, further including a downtube connected to an upstream side of the double joint, and at least one cross tube connected to an upstream side of the downtube, the at least one cross tube extending across the open top of the trough.

10. The apparatus of claim 1, further including a downtube connected to an upstream side of the double joint, and at least one cross tube connected to an upstream side of the downtube, the at least one cross tube extending across the open top of the trough.

11. The apparatus of claim 1, the at least one cross tube supported by a gantry affixed at location above the open top of the trough.

* * * * *